US012720485B2

(12) United States Patent
Ozturk et al.

(10) Patent No.: US 12,720,485 B2
(45) Date of Patent: Aug. 25, 2026

(54) BUSY INDICATION FOR PAGING IN A WIRELESS NETWORK

(71) Applicant: QUALCOMM Incorporated, San Diego, CA (US)

(72) Inventors: Ozcan Ozturk, San Diego, CA (US); Juan Zhang, Beijing (CN); Xipeng Zhu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 298 days.

(21) Appl. No.: 18/551,096

(22) PCT Filed: May 6, 2021

(86) PCT No.: PCT/CN2021/091968

§ 371 (c)(1),
(2) Date: Sep. 18, 2023

(87) PCT Pub. No.: WO2022/233009

PCT Pub. Date: Nov. 10, 2022

(65) Prior Publication Data

US 2024/0251382 A1 Jul. 25, 2024

(51) Int. Cl.
*H04W 68/00* (2009.01)
*H04W 8/18* (2009.01)

(52) U.S. Cl.
CPC ......... *H04W 68/005* (2013.01); *H04W 8/183* (2013.01)

(58) Field of Classification Search
CPC ............................ H04W 68/005; H04W 8/183
USPC .......................................................... 455/458
See application file for complete search history.

(56) References Cited

U.S. PATENT DOCUMENTS

2020/0305118 A1* 9/2020 Ryu ...................... H04W 76/10
2020/0396591 A1 12/2020 Ou et al.
2022/0210632 A1* 6/2022 Tseng .................... H04W 8/183
2022/0217675 A1* 7/2022 Chen ..................... H04W 68/02
2022/0240213 A1* 7/2022 Ly ......................... H04W 60/04
2022/0272761 A1* 8/2022 Park ...................... H04W 76/27
(Continued)

FOREIGN PATENT DOCUMENTS

CN 102984801 A 3/2013
CN 112218310 A 1/2021
(Continued)

OTHER PUBLICATIONS

International Search Report and Written Opinion—PCT/CN2021/091968—ISA/EPO—Jan. 25, 2022.
(Continued)

*Primary Examiner* — Michael R Neff
(74) *Attorney, Agent, or Firm* — Loza & Loza, LLP

(57) ABSTRACT

Aspects relate paging message management for a wireless communication device having multiple subscriber identity modules (SIMs), where a first SIM is active and a second SIM is inactive. A Radio Access Network (RAN) paging message is received and processed for the second SIM of the wireless communication device. A busy indication message including an establishment cause value for the busy indication message is generated in response to the RAN paging message. The busy indication message may be transmitted to a wireless communication network to pause or halt further paging messages in accordance with the busy indication message.

30 Claims, 13 Drawing Sheets

(56) References Cited

U.S. PATENT DOCUMENTS

2023/0070472 A1* 3/2023 Li .......................... H04W 8/183
2023/0262655 A1* 8/2023 Li .......................... H04W 68/02
455/458
2024/0015695 A1 1/2024 Hong

FOREIGN PATENT DOCUMENTS

CN 112425225 A 2/2021
CN 112514472 A 3/2021
WO 2012094428 A1 7/2012

OTHER PUBLICATIONS

Supplementary European Search Report—EP21939657—Search Authority—Berlin—Jan. 28, 2025.

* cited by examiner 200
214
204
206
232
228
227
212
226
RRH
216
230
224
210
208
234
218
220
222
202
236
238
237
240
242

BUSY INDICATION FOR PAGING IN A WIRELESS NETWORK

CROSS-REFERENCE TO RELATED APPLICATION(S)

This application is the U.S. national stage of PCT patent application number PCT/CN2021/091968 filed on May 6, 2021.

TECHNICAL FIELD

The technology discussed below relates generally to wireless communication systems, and more particularly, to managing paging messages between subscriber identification module (SIM) cards in multi-SIM card (MSIM) wireless communication devices.

INTRODUCTION

Fifth Generation (5G) New Radio (NR) networks may deploy cells that utilize either a millimeter wave (e.g., FR2) carrier or a sub-6 GHz (e.g., FR1) carrier to facilitate communication between a base station and a user equipment (UE). In some wireless communication networks, a UE may be configured to simultaneously communicate on multiple carriers. For example, a UE may be configured to operate using multiple SIMs, allowing the scheduled entity to connect to multiple networks, or have multiple independent connections (e.g., one connection per SIM) to the same network. During typical operation, when a multi-SIM scheduled entity is active (e.g., Radio Resource Control (RRC) connected) on a first SIM, another non-active SIM may be configured to monitor the wireless network for paging messages.

If the scheduled entity detects a paging message, the scheduled entity may be configured such that the non-active SIM may automatically respond, or have the option to respond, or not respond, to the paging message. In some configurations, scheduled entities may not respond to a paging message, for example, when the scheduled entity does not have the capability to have simultaneous active connections on multiple SIMs, and the connection on the active SIM is of a higher priority (e.g., an emergency voice call). If the scheduled entity does not respond to the paging, the network may not know if the lack of a response is due to an internal configuration of the schedule entity, or if the lack of a response was due to a network failure of the paging message.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a user equipment (UE) in a wireless communication network is disclosed that includes a transceiver, a memory, a first subscriber identity module (SIM), a second SIM, and a processor coupled to the first SIM, the second SIM, the transceiver and the memory. The processor and the memory may be configured to process a Radio Access Network (RAN) paging message for the second SIM, while the first SIM is active, generate a busy indication message in response to the RAN paging message, wherein the busy indication message includes an establishment cause value for the busy indication message, and transmit the busy indication message to the wireless communication network.

In some examples, a method of wireless communication at a wireless communication device in a wireless communication network is disclosed. The method may include activating a first SIM of the wireless communication device, processing a RAN paging message for a second SIM of the wireless communication device, generating a busy indication message in response to the RAN paging message, wherein the busy indication message includes an establishment cause value for the busy indication message, and transmitting the busy indication message to the wireless communication network.

In some examples, a scheduling entity in a wireless communication network is disclosed that includes a transceiver, a memory, and a processor coupled to the transceiver and the memory. The processor and the memory may be configured to transmit a paging message for a UE, receive a busy indication message in response to the transmitted paging message, wherein the busy indication message includes an establishment cause value for the busy indication message, release the UE to RRC Inactive state according to the busy indication message, and filter further paging messages from being transmitted to the UE according to the busy indication message.

In some examples, a method of wireless communication at a scheduling entity in a wireless communication network is disclosed. The method may include, transmitting a paging message for a UE, receiving a busy indication message in response to the transmitted paging message, wherein the busy indication message includes an establishment cause value for the busy indication message, releasing the UE to RRC Inactive state according to the busy indication message, and filtering further paging messages from being transmitted to the UE according to the busy indication message.

These and other aspects of the invention will become more fully understood upon a review of the detailed description, which follows. Other aspects, features, and examples will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples it should be understood that such exemplary examples can be implemented in various devices, systems, and methods.

DETAILED DESCRIPTION

Figure 1:
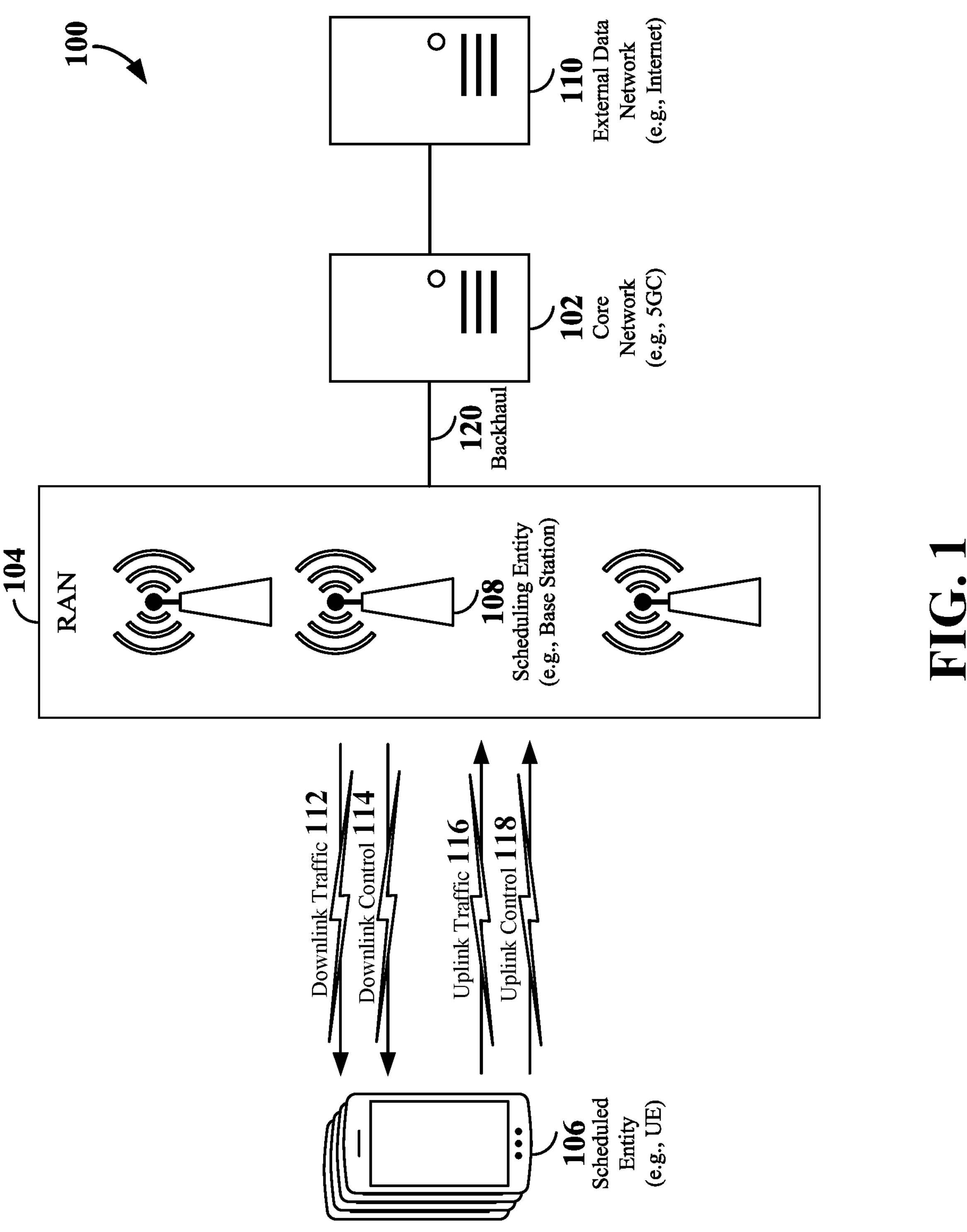
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (CUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
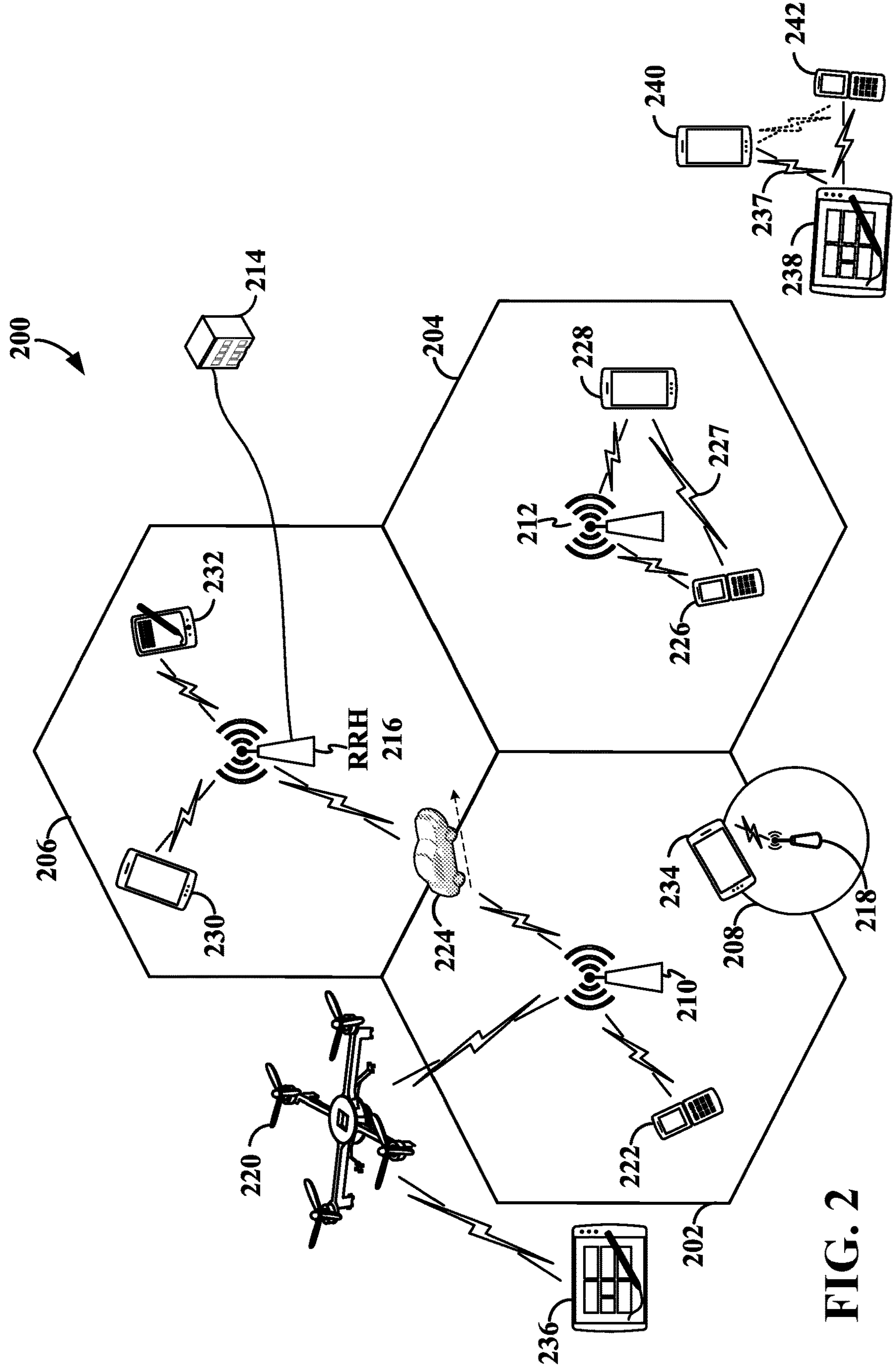
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
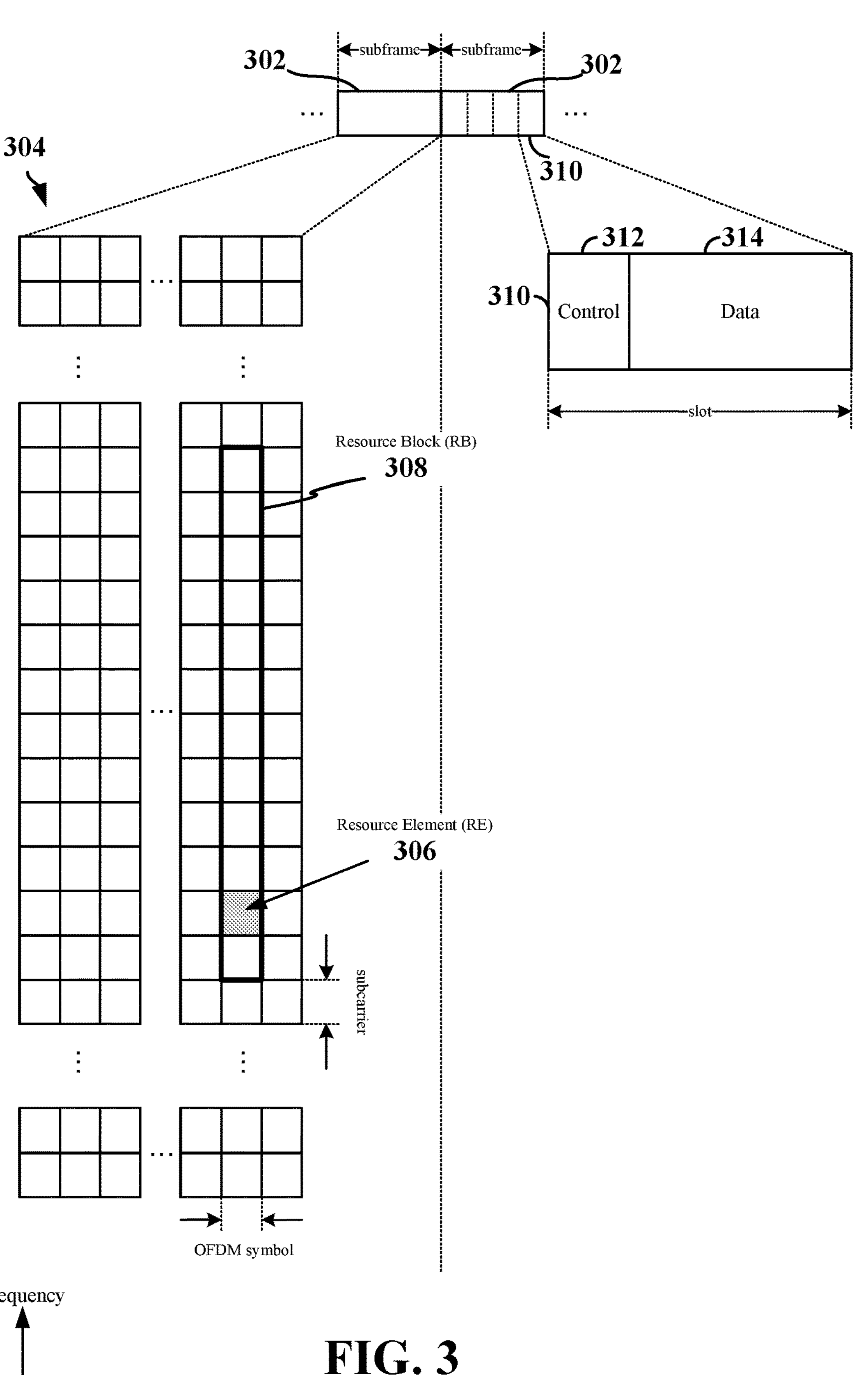
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device)

to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Wireless communication networks, such as 4G LTE and/or 5G NR networks, may further support carrier aggregation in a multi-cell transmission environment where, for example, different base stations and/or different transmission and reception points (TRPs) may communicate on different component carriers within overlapping cells. In some aspects, the term component carrier may refer to a carrier frequency (or band) utilized for communication within a cell.

Figure 4:
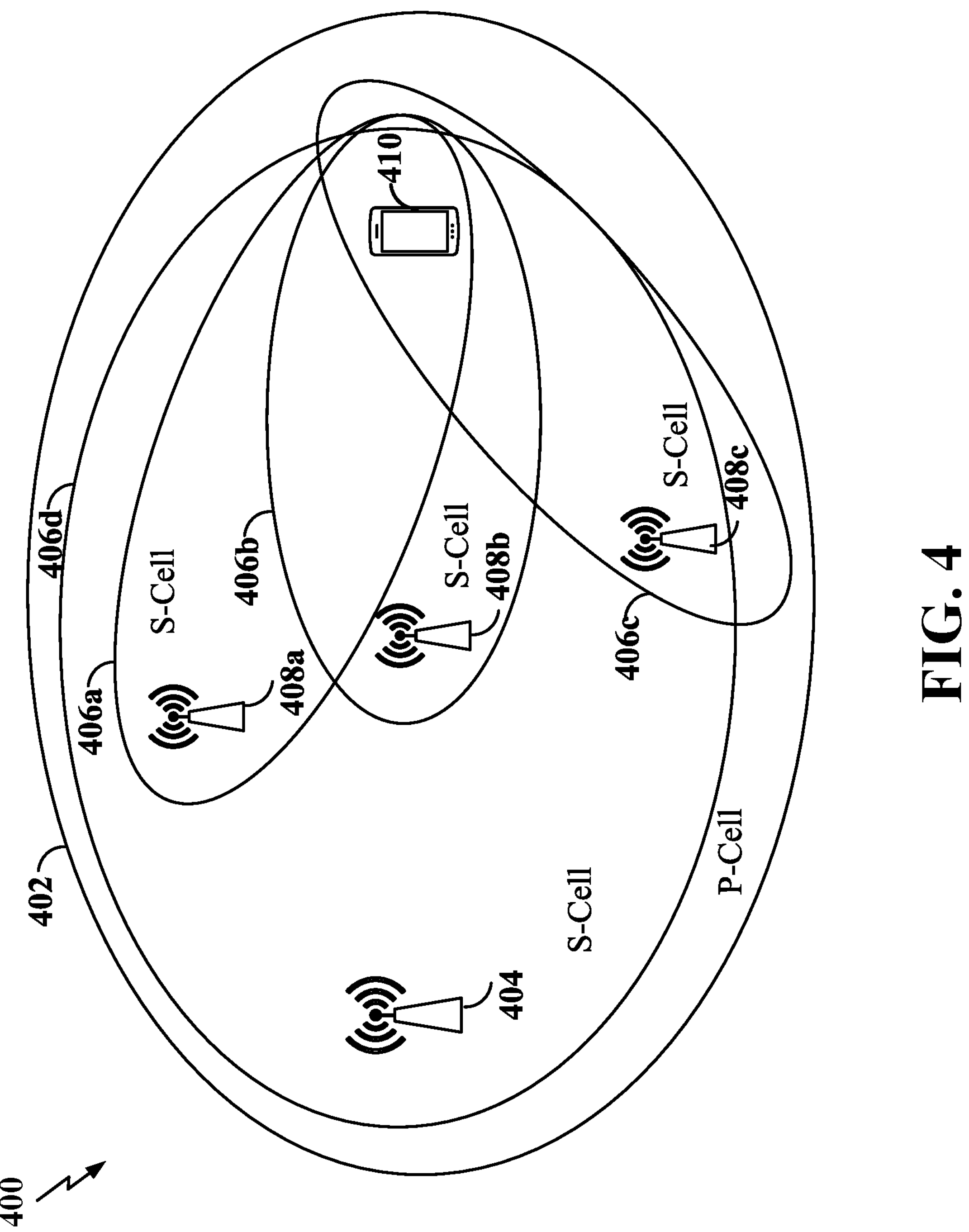
FIG. 4 is a diagram illustrating a multi-cell transmission environment according to some aspects.

FIG. 4 is a diagram illustrating a multi-cell transmission environment 400 according to some aspects. The multi-cell transmission environment 400 includes a primary serving cell (PCell) 402 and one or more secondary serving cells (SCells) 406*a*. 406*b*, 406*c*, and 406*d*. The PCell 402 may be referred to as the anchor cell that provides a radio resource control (RRC) connection to a UE (e.g., UE 410).

When carrier aggregation is configured in the multi-cell transmission environment 400, one or more of the SCells 406*a*-406*d* may be activated or added to the PCell 402 to form the serving cells serving the UE 410. In this case, each of the serving cells corresponds to a component carrier (CC). The CC of the PCell 402 may be referred to as a primary CC, and the CC of a SCell 406*a*-406*d* may be referred to as a secondary CC.

Each of the PCell 402 and the SCells 406*a*-406*d* may be served by a transmission and reception point (TRP). For example, the PCell 402 may be served by TRP 404 and each of the SCells 406*a*-406*c* may be served by a respective TRP 408*a*-408*c*. Each TRP 404 and 408*a*-408*c* may be a base station (e.g., gNB), remote radio head (RRH) of a gNB, or other scheduling entity similar to those illustrated in any of FIG. 1 or 2. In some examples, the PCell 402 and one or more of the SCells (e.g., SCell 406*d*) may be co-located. For example, a TRP for the PCell 402 and a TRP for the SCell 406*d* may be installed at the same geographic location. Thus, in some examples, a TRP (e.g., TRP 404) may include multiple TRPs, each corresponding to one of a plurality of co-located antenna arrays, and each supporting a different carrier (different CC). However, the coverage of the PCell 402 and SCell 406*d* may differ since component carriers in different frequency bands may experience different path loss, and thus provide different coverage.

The PCell 402 is responsible not only for connection setup, but also for radio resource management (RRM) and radio link monitoring (RLM) of the connection with the UE 410. For example, the PCell 402 may activate one or more of the SCells (e.g., SCell 406*a*) for multi-cell communication with the UE 410 to improve the reliability of the connection to the UE 410 and/or to increase the data rate. In some examples, the PCell may activate the SCell 406*a* on an as-needed basis instead of maintaining the SCell activation when the SCell 406*a* is not utilized for data transmission/reception in order to reduce power consumption by the UE 410.

In some examples, the PCell 402 may be a low band cell, and the SCells 406 may be high band cells. A low band (LB) cell uses a CC in a frequency band lower than that of the high band cells. For example, the high band cells may each use a respective mmWave CC (e.g., FR2 or higher), and the low band cell may use a CC in a lower frequency band (e.g., sub-6 GHz band or FR1). In general, a cell using an FR2 or higher CC can provide greater bandwidth than a cell using an FR1 CC. In addition, when using above-6 GHz frequency (e.g., mmWave) carriers, beamforming may be used to transmit and receive signals.

In some examples, the PCell 402 may utilize a first radio access technology (RAT), such as LTE, while one or more of the SCells 406 may utilize a second RAT, such as 5G-NR. In this example, the multi-cell transmission environment may be referred to as a multi-RAT—dual connectivity (MR-DC) environment. One example of MR-DC is an Evolved-Universal Terrestrial Radio Access Network—New Radio dual connectivity (EN-DC) mode that enables a UE to simultaneously connect to an LTE TRP and a NR TRP to receive data packets from and send data packets to both the LTE TRP and the NR TRP.

Figure 5:
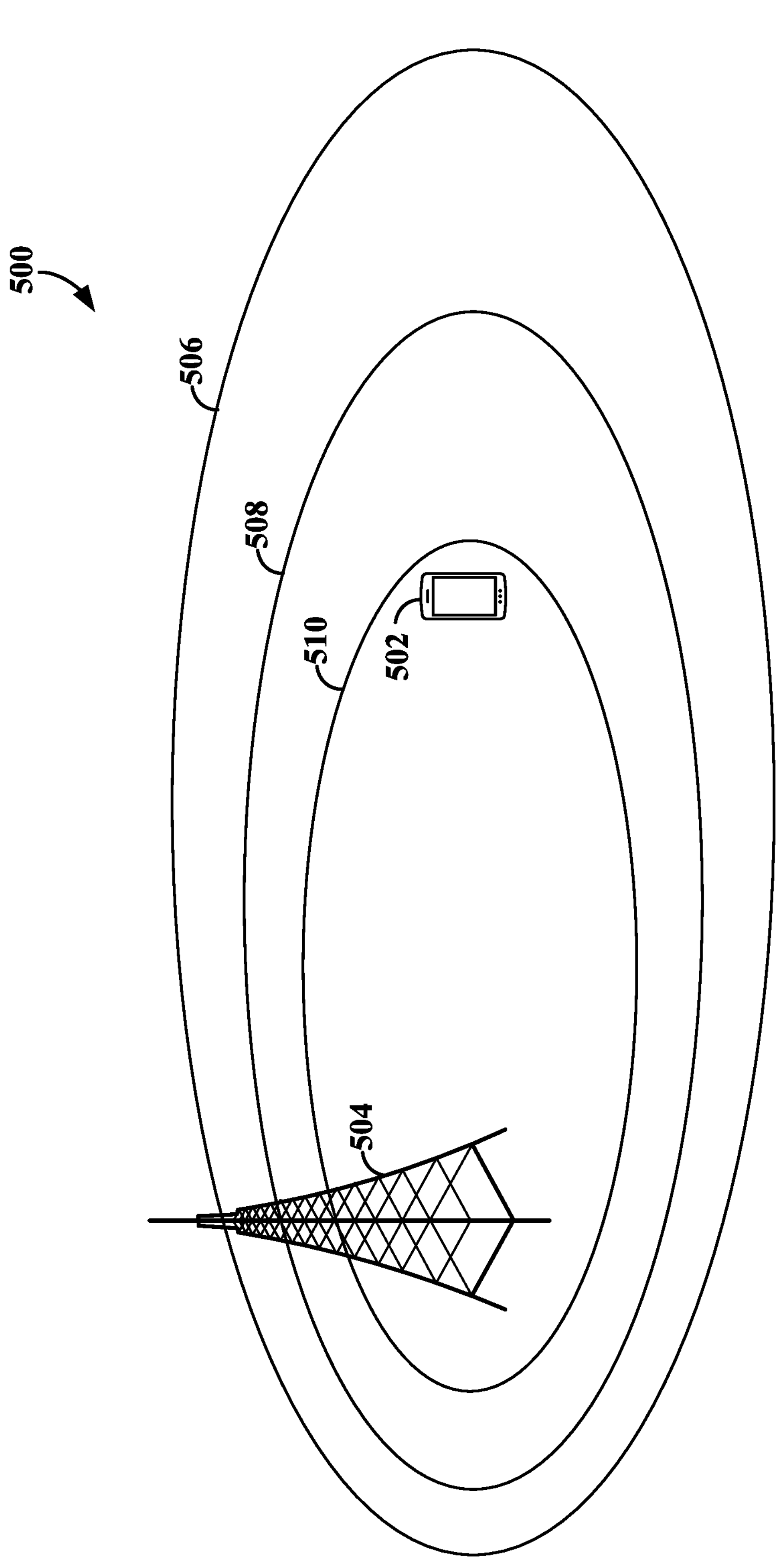
FIG. 5 is a diagram illustrating a multi-RAT deployment environment according to some aspects.

FIG. 5 is a diagram illustrating a multi-RAT deployment environment 500 according to some aspects. In the multi-RAT deployment environment 500 shown in FIG. 5, a UE 502 may communicate with a base station 504 using one or more of a plurality of RATs. For example, the base station 504 may include a plurality of co-located TRPs, each serving a respective cell 506, 508, and 510. Each cell 506, 508, and 510 may communicate using a respective RAT and corresponding frequency range. In some examples, the RATs may include LTE and NR. For example, a first cell 506 may be an LTE cell that operates in an LTE frequency range to provide wide area coverage to the UE 502. For example, the LTE frequency range may include the E-UTRA frequency bands between 450 MHz and 3.8 GHz. In addition, a second cell 508 may be a NR cell that operates in a sub-6 GHz frequency range (e.g., FR1), and a third cell 510 may be a NR cell that operates in a mmWave frequency range (e.g., FR2 or higher).

In some examples, the UE 502 may communicate with the base station 504 over two or more of the cells 506, 508, and 510 in a MR-DC mode, such as EN-DC, as described above. In other examples, the UE 502 may be a multi-SIM card (MSIM) UE that includes two or more SIM cards, each associated with a respective subscription and respective phone number. For example, the UE 502 may operate under a dual-SIM, dual-standby (DSDS) operational mode. In another example, the UE 502 may operate under a dual-SIM, dual-active (DSDA) mode. In a further example, UE 502 may include a first SIM card having a dedicated data subscription (DDS) that may be used by the UE 502 for data services, and a second SIM card having a non-DDS (n-DDS) that may be used by the UE 502 for voice calls. In some examples, each SIM card may communicate in a respective RAT. For example, the DDS SIM card may utilize a NR RAT to communicate on cell 508 or 510, and the n-DDS SIM card may utilize an LTE RAT to communicate on cell 506.

Figure 6:
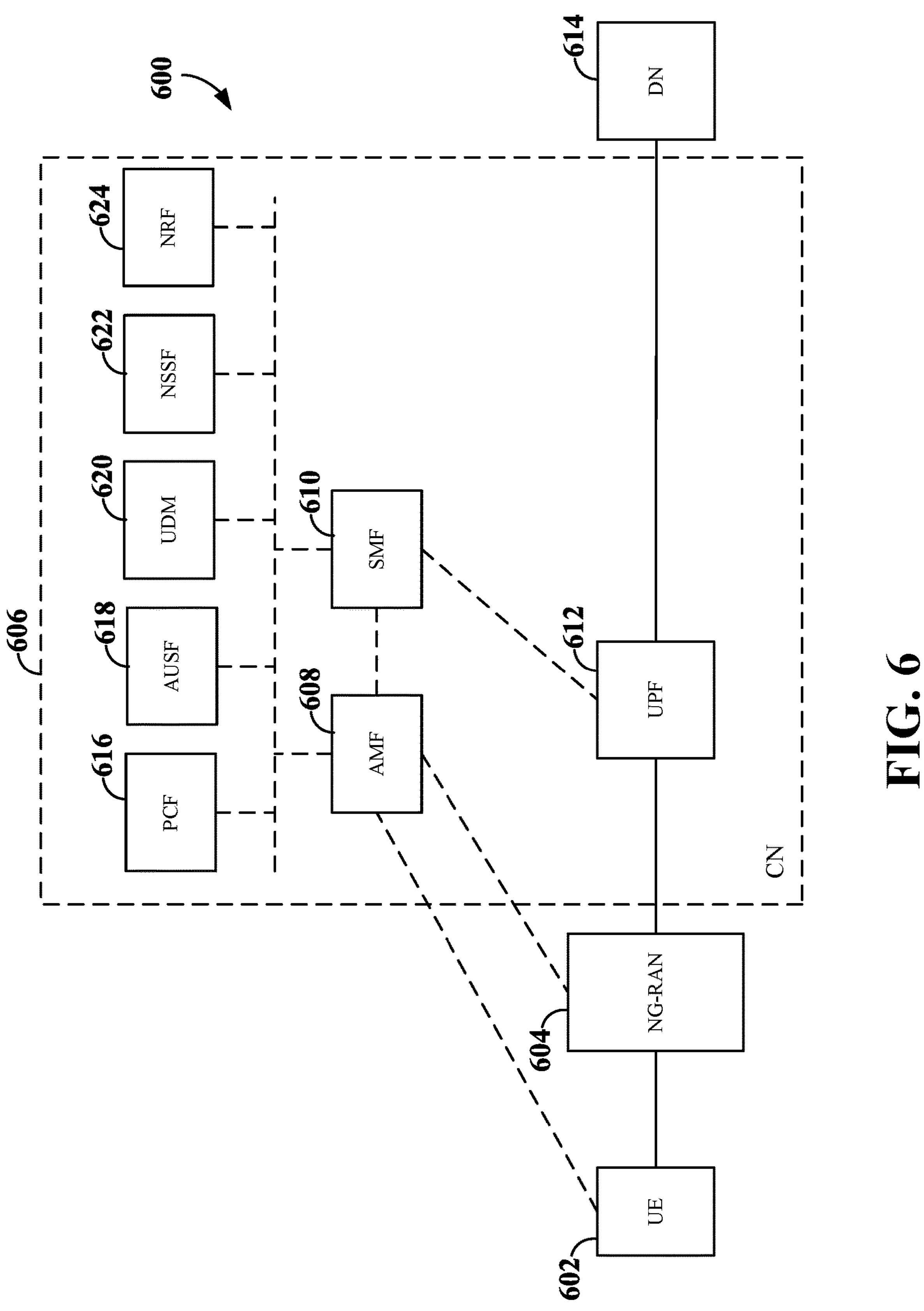
FIG. 6 is a block diagram illustrating an example of a 5G wireless communication system (5GS) according to some aspects.

Referring now to FIG. 6, by way of example and without limitation, a block diagram illustrating an example of various components of a 5G wireless communication system (5GS) 600 is provided. In some examples, the 5GS 600 may correspond to the wireless communication system 100 described above and illustrated in FIG. 1. The 5GS 600 includes a user equipment (UE) 602, a NG-RAN 604, and a core network 606 (e.g., a 5G CN). The NG-RAN 604 may be a 5G RAN and correspond, for example, to the RAN 200 described above and illustrated in FIG. 2. In addition, the UE 602 may correspond to any of the UEs or other scheduled entities shown in FIG. 1 or 2. By virtue of the wireless communication system 600, the UE 602 may be enabled to carry out data communication with an external data network 614, such as (but not limited to) the Internet or an Ethernet network.

The core network 606 may include, for example, an access and mobility management function (AMF) 608, a session management function (SMF) 610, and a user plane function (UPF) 612. The AMF 608 and SMF 610 employ control plane (e.g., non-access stratum (NAS)) signaling to perform various functions related to mobility management and session management for the UE 602. For example, the AMF 608 provides connectivity, mobility management and authentication of the UE 602, while the SMF 610 provides session management of the UE 602 (e.g., processes signaling related to protocol data unit (PDU) sessions between the UE 602 and the external DN 614). The UPF 612 provides user plane connectivity to route 5G (NR) packets to/from the UE 602 via the NG-RAN 604.

As used herein, the term non-access stratum (NAS) may, for example, generally refer to protocols between the UE 602 and the core network 606 that are not terminated in the NG-RAN 604. In addition, the term access stratum (AS) may, for example, generally refer to a functional grouping consisting of the parts in the NG-RAN 604 and in the UE 602, and the protocols between these parts being specific to the access technique (i.e., the way the specific physical media between the UE 602 and the NG-RAN 604 is used to carry information).

The core network 606 may further include other functions, such as a policy control function (PCF) 616, authentication server function (AUSF) 618, unified data management (UDM) 620, network slice selection function (NSSF) 622, a network repository function (NRF) 624, and other functions (not illustrated, for simplicity). The PCF 616 provides policy information (e.g., rules) for control plane functions, such as network slicing, roaming, and mobility management. In addition, the PCF 616 supports 5G quality of service (QOS) policies, and other types of policies. The AUSF 618 performs authentication of UEs 602. The UDM 620 facilitates generation of authentication and key agreement (AKA) credentials, performs user identification and manages subscription information and UE context. The NSSF 622 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case. The NRF 624 is a central repository for all of the 5G network functions (NFs) in the wireless communication system 600. The NRF 624 enables NFs to register and discover one another. In addition, the NRF 624 supports a 5G service-based architecture (SBA).

To establish a connection to the core network 606 (e.g., a 5G core network) via the NG-RAN 604, the UE 602 may transmit a registration request to the AMF 608 core network 606 via the NG-RAN 604. The AMF 608 may then initiate non access stratum (NAS) level authentication between the UE 602 and the core network 608 (e.g., via the AUSF 618 and UDM 620). The AMF 608 may then retrieve mobility subscription data, SMF selection data, and UE context and communicate with the PCF 616 for policy association for the UE 602. The AMF 608 may then send a NAS secure registration accept message to the UE 602 to complete the registration.

Once the UE 602 has registered with the core network 606, the UE 602 may transmit a PDU session establishment request to establish one or more PDU sessions to the core network 606 via the NG-RAN 604. The AMF 608 and SMF 610 may process the PDU session establishment request and establish a data network session (DNS) between the UE 602 and the external DN 614 via the UPF 612. A DNS may include one or more sessions (e.g., data sessions or data flows) and may be served by multiple UPFs 612 (only one of which is shown for convenience). Examples of data flows include, but are not limited to, IP flows, Ethernet flows and unstructured data flows.

With regard to paging, a connection may be established either due to UE data becoming available on the CN side (e.g., 606) or at the UE side (e.g., 602) itself. Before an actual connection establishment begins, the network initiates a paging procedure. In examples where the UE is in an RRC idle state, the CN may determine the RAN node(s) to route the UE data by engaging in a CN-initiated paging procedure to identify one or more gNBs under which the UE has current coverage. In examples where the UE is in an RRC inactive state, the UE's position may be known by the network on a RAN Notification Area (RNA) level, which may cover multiple gNBs. Since, from the CN perspective, the UE is still in a connected state, the CN may not directly send a paging message, but may forward user data via downlink to the last known gNB that has served the UE to perform a RAN-initiated paging procedure. In some examples, RAN paging may include the forwarding of paging messages to other gNBs within the RNA of the UE.

In some examples, the paging messages may be transmitted over PCCH or using DCI messaging. In RRC idle and RRC inactive states, the UE may monitor for paging messages using paging channels, where the UE monitors a single paging occasion (PO) per its idle mode discontinuous reception (DRX) cycle. A PO is configured as a set of PDCCH monitoring occasions that include multiple slots where paging DCI may be sent. The PO is determined by the UE, based on the UE's identity (e.g., 5G-S-Temporary Mobile Subscriber Identity (5G-S-TMSI)) and additional parameters signaled by the network (e.g., DRX configuration).

Figure 7:
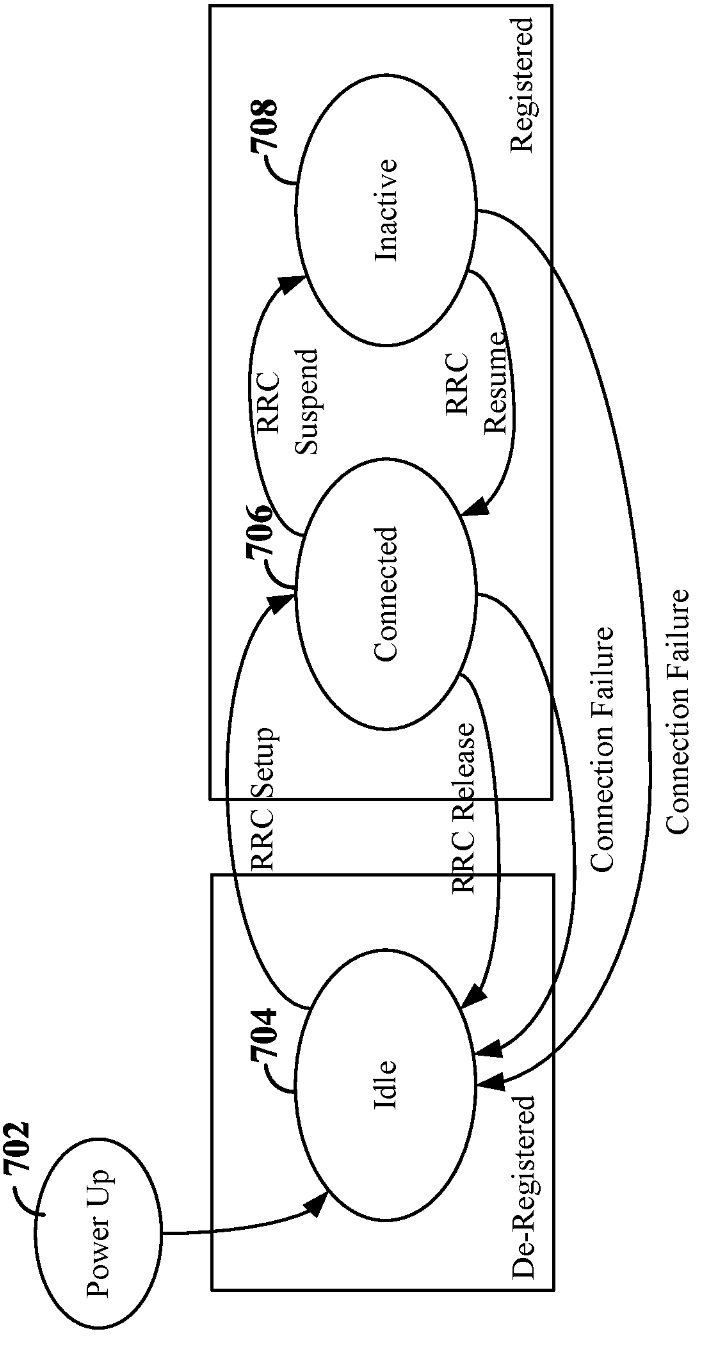
FIG. 7 illustrates an example of 5G state transitions according to some aspects.

FIG. 7 illustrates an example of 5G state transitions according to some aspects. As shown in FIG. 7, when a UE first powers up 702, the UE is in a disconnected state or RRC idle state 704 in which the UE is not registered with (e.g., de-registered from) the 5G core network. The UE can move from the RRC idle state 704 to an RRC connected state 706 during initial attach (registration) or with connection establishment, as described above, to register with and connect to the 5GS. For example, the UE can perform the random-access procedure shown and described above in connection with FIG. 7 to transmit the RRC setup request and transition from the RRC idle state 704 to the RRC connected state 706 (e.g., after Msg4).

While in the RRC connected state 706, if there is no activity from the UE for a period of time, the UE can transmit an RRC suspend request to move from the RRC connected state 706 to an RRC inactive state 708. Upon receiving the RRC suspend request, the UE context of the UE can be stored in the last serving base station (e.g., gNB) or an anchor gNB of the RNA within which the UE is located. In the RRC inactive state 708, the UE remains registered with 5GS.

To transition back from the RRC inactive state 708 to the RRC connected state 706, the UE may transmit an RRC resume request to the NG-RAN (e.g., gNB). The UE may transmit the RRC resume request, for example, when the low activity period is over and there is uplink data available in the uplink buffer for the UE to transmit to the NG-RAN or when there is downlink data present in the NG-RAN for the UE and the NG-RAN pages the UE. For example, the UE may monitor a paging channel on the PDDCH during paging occasions, which may be determined based on a discontinuous reception (DRX) cycle, and if a page is received for the UE from the NG-RAN, the UE may send the RRC resume request to the NG-RAN. The UE may be paged, for example, in the RNA configured for the UE. The RNA may, therefore, define an area within which the UE may move in the RRC inactive state without notifying the network. The RNA is UE-specific and configurable by the NG-RAN.

If the UE detects a new RNA during wake-up prior to the paging occasion, the UE may transmit the RRC resume request to the NG-RAN to perform an RNA update procedure, as described above. For example, prior to the paging occasion, the UE may obtain cell measurements and perform a cell reselection, if necessary, based on the cell measurements and various other cell reselection criteria. If the selected cell is in a new RNA (by comparison with the configured RNA in the UE), the UE may determine that the UE should perform an RNA update procedure. In some examples, the UE may transmit the RRC resume request to perform the RNA update and then transition back to the RRC inactive state if no paging message is received for the UE.

The UE can further transition back to the RRC idle state from the RRC inactive state or from the RRC connected state. For example, while in the RRC inactive state or RRC connected state, the UE may transition back to the RRC idle state upon experiencing a connection failure. In addition, while the UE is in the RRC connected state, the UE may transmit an RRC release request to the NG-RAN to detach from the 5GS and transition back to the RRC idle state. The NG-RAN may provide an RRC connection release message back to the UE that includes, for example, dedicated cell reselection priority information that may be utilized by the UE in cell reselection to transition back to the RRC connected state.

In RRC Idle state 704, the UE is not registered to a particular cell, hence the UE doesn't have an AS context and any other information received from the network. The network initiates the RRC connection release procedure to move a UE in RRC Connected 706 to RRC Idle 704 state. The UE may wake up periodically (e.g., according to a configured DRX cycle) and monitor for paging messages from the network. The network can reach UEs in RRC Idle state through paging messages, and to notify UEs in RRC Idle change of system information change and ETWS/CMAS indications through short messages. Both paging messages and short messages are addressed with P-RNTI on PDCCH, but while the former is sent on PCCH, the latter is sent over PDCCH.

While in RRC Idle 704, the UE monitors the paging channels for CN-initiated paging; in RRC Inactive, the UE also monitors paging channels for RAN-initiated paging. A UE need not monitor paging channels continuously; paging DRX may be defined where the UE in RRC Idle 704 or RRC Inactive 708 is only required to monitor paging channels during one Paging Occasion (PO) per DRX cycle. In this state, the UE itself manages mobility based on the network configurations via cell (re-) selections. The UE performs the required neighboring cell measurements which are required for cell (re-) selections. On transition from RRC Connected 706 or RRC Inactive 708 to RRC Idle 704, a UE may camp on a cell as result of cell selection according to the frequency be assigned by RRC in the state transition message, if any. In RRC Idle state, the UE cannot transmit anything in the uplink except for PRACH as part of RA procedure initiated when UE desires to transit to RRC Connected 706 state or to request for on-demand system information.

During RRC Inactive 708 state, the UE may periodically monitor for paging messages (e.g., using DRX cycle) from the network. The network can reach UEs in RRC Inactive 708 state using paging messages, and to notify UEs of system information and ETWS/CMAS indications through Short Messages. Both paging messages and short messages are addressed with P-RNTI on PDCCH, but while the former is sent on PCCH, the latter is sent over PDCCH directly. The UE may monitor a Paging channel for CN paging using 5G-S-TMSI and RAN paging using full I-RNTI (Inactive RNTI). I-RNTI is used to identify the suspended UE context of a UE in RRC Inactive state. The network assigns I-RNTI to the UE when moving from RRC Connected to RRC Inactive state in RRCRelease message within SuspendConfig. In RRC Inactive state, the UE cannot transmit anything in the uplink except for PRACH as part of RA procedure initiated when UE desires to transit to RRC Connected state (to transmit RRCResumeRequest) or to request for on-demand system information. A gNB can send a UE from RRC Connected to RRC Inactive state by transmitting RRCRelease message with suspendConfig.

Figure 8:
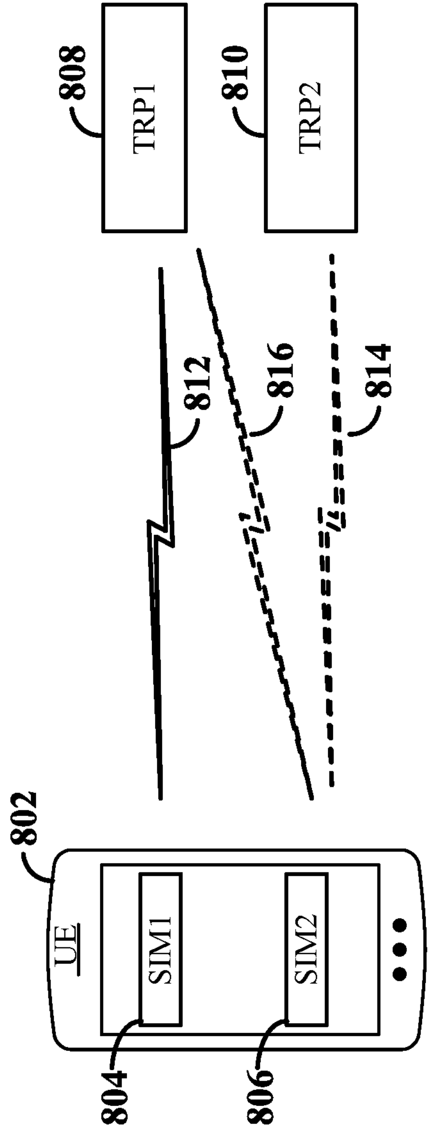
FIG. 8 is a diagram illustrating a multi-subscriber identity module card (MSIM) wireless communication device according to some aspects.

FIG. 8 is a simplified diagram illustrating a multi-subscriber identity module card (MSIM) wireless communication device according to some aspects. In the example shown in FIG. 8, the wireless communication device (UE 802) includes two SIM cards (SIM1 804 and SIM2 806). In some examples, each SIM card 804 and 806 may be configured to transmit communication signals (812, 816) over carrier frequency in a common frequency band in the same RAT (808). In some examples, each SIM card 804 and 806 may be configured to communicate with a different RAT (808, 810). For example, SIM1 804 is configured for communication utilizing a NR RAT and SIM2 806 is configured for communication utilizing an LTE RAT. Thus, SIM1 804 may communicate signals 812 with TRP1 808 (e.g., NR TRP) over a first carrier frequency in a first frequency band of a NR frequency range (e.g., FR1 or FR2) and SIM2 806 may communicate signals 814 with TRP2 810 (e.g., LTE TRP) over a second carrier frequency in a second frequency band of an LTE frequency range.

For example, SIM1 804 may have a DDS for communication of data 812 (e.g., c-mail, Internet, etc.) with the NR TRP 808 and SIM2 806 may have a n-DDS for communication of voice signals 814 with the LTE TRP 810. In this example, SIM1 804 may be in a radio resource control (RRC) connected mode, while SIM2 806 may be in an RRC idle mode until a voice call is made or received by the UE 802. This configuration of SIM cards 804 and 806 may be referred to as a dual SIM dual standby mode in which the UE 802 includes a single transceiver for both SIM cards 804 and 806 and both SIM cards 804 and 806 are active, but only one SIM card 804 or 806 may use the transceiver for same direction communications at a time. For example, SIM1 804 may be in an RRC connected mode to send/receive data to/from the NR network, while SIM2 806 may be in an RRC idle mode. SIM2 806 may periodically access the transceiver and utilize a receive chain (e.g., RF/baseband processor) in the UE 802 to receive and decode any paging messages from the LTE network. Thus, SIM2 806 may periodically interrupt receive operations (e.g., downlink operations) of the SIM1 804 to receive and decode a page. During a paging time window of SIM2 806 within which SIM2 806 may receive the page, SIM1 804 may continue to use the transceiver for transmit operations (e.g., uplink operations). In other examples, SIM1 804 may have the n-DDS, while SIM2 has the DDS.

In some examples, the SIM card 804 and 806 may be in a passive mode MSIM configuration, where one SIM (e.g., 804 or 806) may be selected for use at a given time. Generally speaking, the SIMs 804, 806 in passive mode may be configured to share a single cellular transceiver and have logical connection to a single network (e.g., TRP1 808) at any given time. In some examples, the SIM cards 804 and 806 may be in a dual SIM, dual Standby (DSDS) operating mode, where both SIMs 804, 806 can be used for idle-mode cellular network connection. Here, SIM1 804 and SIM2 806 may also share a single cellular transceiver, but when a primary cellular radio connection (e.g., via 804) is active, the second connection (e.g., 806) is limited. Using time multiplexing, two radio connections may be maintained in RRC idle mode. In some examples, when one SIM is on-call in the network, the network may not be able to read paging for the second SIM, which may leave the connection unavailable for the duration of the call. However, registration of the second SIM is maintained.

In some examples, during a data session, in DSDS mode, data connection on a primary connection (e.g., 812) may be managed on a "best effort" basis to accommodate reading of the secondary connection (e.g., 816) paging. DSDS devices that support Voice over Wi-Fi may be configured to generally allow voice connections to be maintained over the Wi-Fi bearer regardless of the status of the cellular bearers. In some examples, SIM1 804 and SIM2 806 may be configured to operate under a dual SIM dual active (DSDA) mode, where both SIMs (804, 806) may be used in both RRC idle and RRC connected modes. In this example, each SIM may be configured with a dedicated transceiver.

As discussed above, if a scheduled entity (e.g., UE 802) detects a paging message, the scheduled entity may be configured such that a non-active SIM (e.g., 806) may not respond to the paging message due to internal UE configurations. One internal configuration may include, but is not limited to, a scheduled entity not having the capability to have simultaneous active connections on multiple SIMs, and the connection on the active SIM is of a higher priority (e.g., an emergency voice call). If the scheduled entity does not respond to the paging, the network may not know if the lack of a response is due to an internal configuration of the schedule entity, or if the lack of a response was due to a network failure of the paging message. Accordingly, in some examples, a MSIM scheduled entity may be configured to transmit a busy indication to the network, so that the network RAN pauses or stops continued paging in the cell or other cells.

Figure 9:
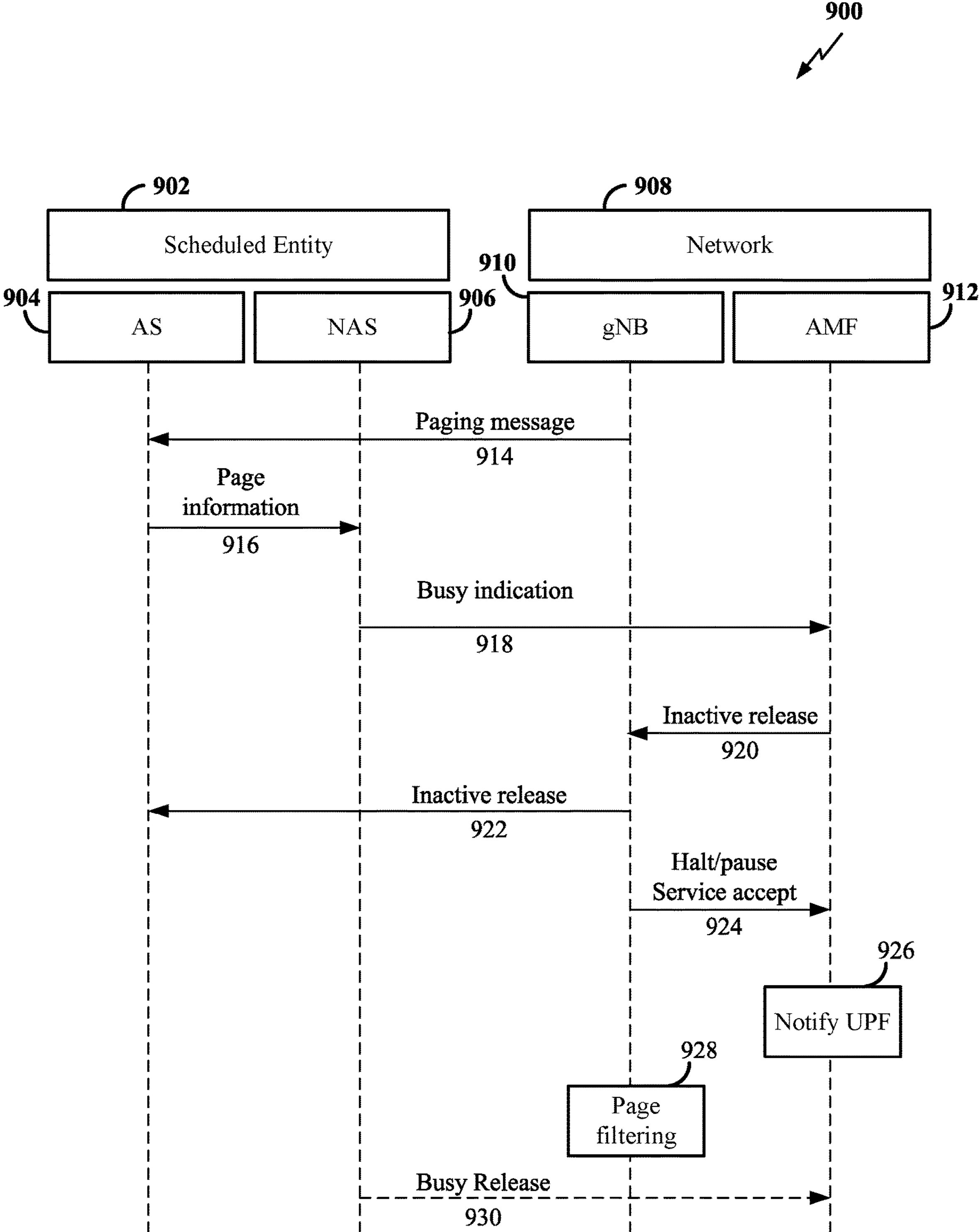
FIG. 9 is a flow diagram conceptually illustrating a scheduled entity generating and transmitting a busy indication to a wireless network according to some aspects.

FIG. 9 shows a simplified signaling flow diagram 900 for providing a busy indication from a scheduled entity to a network according to some aspects. In this example, a scheduled entity 902 is shown communicating with a network 908, as shown in the figure. The scheduled entity 902 may be configured as a UE, such as UEs 106, 410, 502, 602, 704, and 902, described above, and may be configured as a MSIM UE as described above in connection with FIG. 9. The network 908 may be configured as any of wireless networks described above in connection with FIGS. 1, 2, 4, 5, and 6. The communications for scheduled entity 902 associated with paging and network connection may be configured in the control plane, including an AS layer 904 and NAS layer 906 of the radio protocol architecture. An RRC layer of the scheduled entity 902 is responsible for establishing and configuring signaling radio bearers (SRBs) and data radio bearers (DRBs) between the network (e.g., gNB 910) the UE, paging initiated by the 5GC or NG-RAN, and broadcast of system information related AS 904 and NAS 906. The RRC layer may be further responsible for QoS management, mobility management (e.g., handover, cell selection, inter-RAT mobility), UE measurement and reporting, and security functions. The NAS layer 906 is terminated at the AMF 912 in the core network and performs various functions, such as authentication, registration management, and connection management.

In this example, when the scheduled entity 902 is in RRC Inactive mode, it may remain connected to the CN, similar to a RRC Connected mode. In this mode, the RAN (e.g., gNB) may be configured to handle UE mobility and paging. Here, new signaling may be introduced to use NAS signaling in RRC Inactive mode to facilitate interaction between AS 904 and NAS 906 in the scheduled entity 902, and between the CN (AMF 912) and RAN (gNB 910). During an RRC Idle mode, the scheduled entity may be configured to provide a busy indication, based on a Service Request (SR). However, in RRC Inactive mode, the SR may be configured to be transmitted only to set up User Plane resources for PDU sessions, or for emergency fallback.

Continuing with the example, the gNB 910 of network 908 may transmit a paging message 914 to the AS 904 of an MSIM-configured scheduled entity 902, where the paging message may be directed to a non-active SIM (e.g., 906) of the scheduled entity 902 while an active SIM (e.g., 904) is in use. The paging message is configured as a RAN-paging message and is initiated by gNB 910. The paging message may further include priority data indicating a priority for the paging message for the non-active SIM. If the priority of the paging message is less than the priority of the existing connection of the active SIM (e.g., active connection is a voice call, and paging for the non-active SIM is for a non-voice call), the AS 904 may forward the paging message and related page information (e.g., priority, traffic type) to NAS 906 in message 916.

The NAS 906 then processes the paging message data from AS 904, generates a busy indication message, and transmits the busy indication message in 918 to the AMF 912. The busy indication message includes an RRC establishment cause value to indicate a busy status for subsequent use by the AMF 912 in an RRC Resume Request. In some examples, the scheduled entity 902 may be configured with accessibility control and differentiation actions that can be applied to all RRC states (RRC Idle, RRC Inactive, RRC Connected) for each SIM. For example, a scheduled entity SIM (e.g., 906) in RRC Idle mode that has no connection with the network may move to an RRC Connected state by performing initial attach or connection establishment procedures. If the SIM has no activity for a given time, the SIM can be moved to an RRC Inactive state, where its connection with the RAN (e.g., gNB 910) is removed. However, the connection between the RAN and the CN is kept, as well as the UE Context (information required to maintain services), for faster and efficient re-transition back to RRC Connected mode.

The busy indication message in 918 may further include data indicating PDU sessions for which the scheduled entity 902 prefers not to be paged. The indication message may further include a time duration value in which paging may be resumed after an initial pause or cessation of transmitting paging messages. In some examples, the scheduled entity 902 may be configured to monitor the active SIM and may transmit a busy release signal 930 when the active SIM is no longer in use, thus similarly indicating that paging may be resumed by the network 908. In some examples, the busy indication message 918 may include a unique Access Identify and/or Access Class as part of SIM information used for Unified Access Control (UAC) permission for the busy indication message.

After receiving the busy indication message 918, the AMF 912 transmits an inactive release message 920 to the gNB 910 in order to place the inactive SIM of scheduled entity 902 into an RRC Inactive state, and to transmit the establishment cause associated with the busy indication message. After receiving the establishment cause for the busy indication, the gNB 910 transmits a message 922 to the scheduled entity 902 to place the non-active SIM of scheduled entity 902 into an RRC Inactive mode. The gNB then informs the AMF 912 that the scheduled entity was released to RRC Inactive, and further informs the AMF 912 in 924 to halt/pause Service Accept messaging to the non-active SIM of the scheduled entity 902. After receiving message 922, the AMF 912 may notify the User Plane Function (UPF) (see 612) in 926 to stop transmitting data to the gNB 910, and/or to stop sending any signaling data to the gNB 910.

In some examples, the gNB 910 may be configured as an anchor gNB, and may communicate with other gNBs (e.g., serving gNBs) in network 908. Based on the busy indication messaging, the AMF 912 may not perform UE context retrieval, and a serving gNB may send any signaling data to the gNB 910 (e.g., the anchor gNB), where the anchor gNB 910 may perform filtering of page messages 928 between scheduled entity 902 and network 908 to prevent unnecessary paging messages and/or busy indications. In some examples, a serving gNB may pass a Resume Request and busy indication NAS message to the anchor gNB (910), in which the anchor gNB would generate a RRC Reject message. In this example, the anchor gNB would include an establishment cause value for the busy indication in the RRC Reject message.

Figure 10:
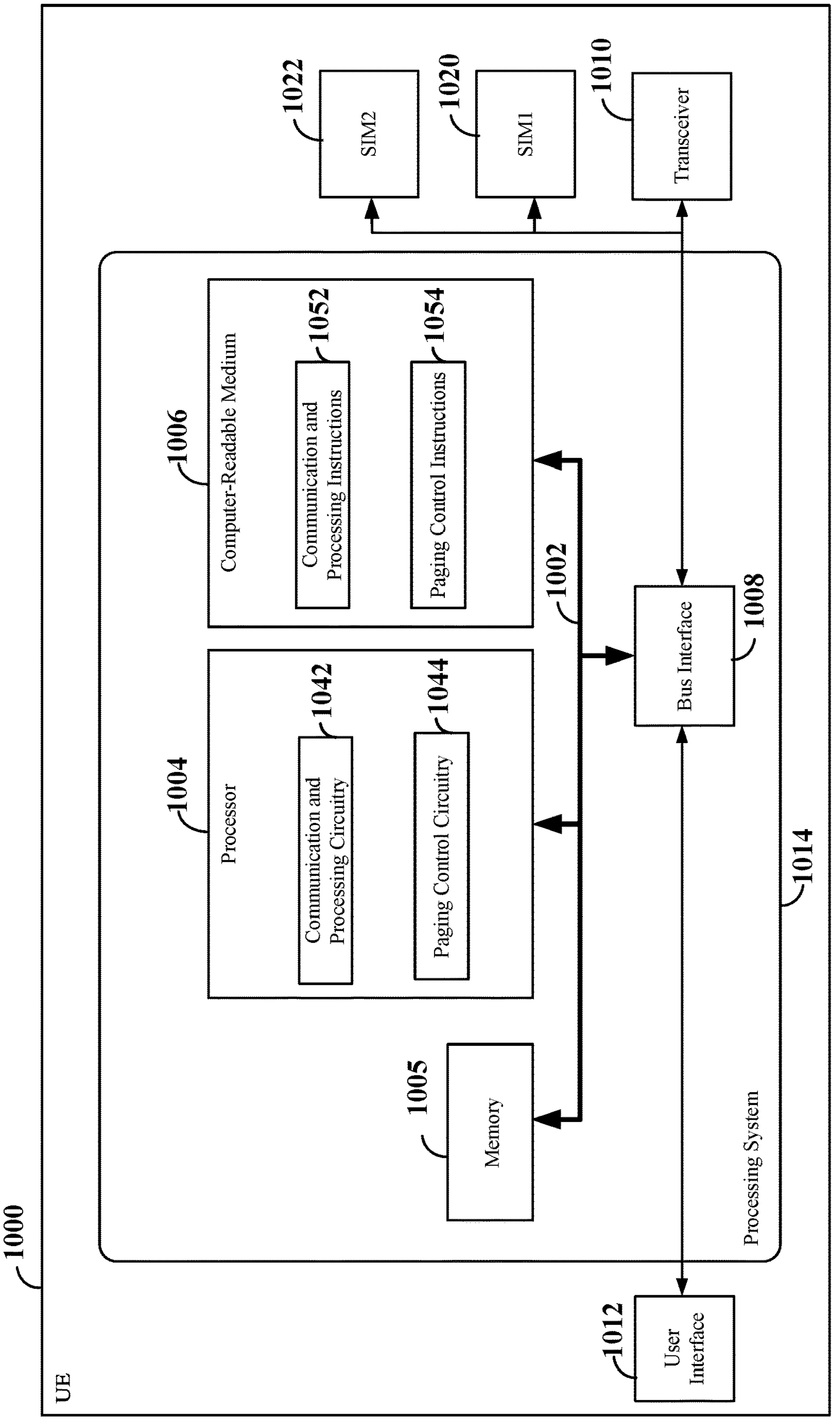
FIG. 10 is a block diagram conceptually illustrating an example of a hardware implementation for a scheduled entity according to some aspects.

FIG. 10 is a block diagram illustrating an example of a hardware implementation for a user equipment (UE) 1000 employing a processing system 1014. For example, the UE 1000 may be any of the UEs, wireless communication devices, or other scheduled entities illustrated in any one or more of FIGS. 1, 2, 4-6, 8 and/or 9.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described below and illustrated in FIGS. 7, 9, 12 and/or 13.

The processor 1004 may in some instances be implemented via a baseband or modem chip and in other implementations, the processor 1004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further.

A bus interface 1008 provides an interface between the bus 1002, a transceiver 1010, and one or more subscriber identity module (SIM) cards 1020 and 1022. The transceiver 1010 provides a communication interface or a means for communicating with various other apparatus over a transmission medium (e.g., air interface). The SIM cards 1020 and 1022 may include, for example, a first SIM card (SIM1) 1020 and a second SIM card (SIM2) 1022. SIM1 may be associated with a DDS to provide data services, while SIM2 may be associated with a n-DDS to provide voice services. Depending upon the nature of the apparatus, a user interface 1012 (e.g., keypad, display, speaker, microphone, joystick) may also be provided. Of course, such a user interface 1012 is optional, and may be omitted in some examples.

The processor 1004 is responsible for managing the bus 1002 and general processing, including the execution of software stored on the computer-readable medium 1006. The software, when executed by the processor 1004, causes the processing system 1014 to perform the various functions described herein for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1042, configured to communicate with one or more base stations (e.g., gNB or eNB) and/or TRPs via Uu links. For example, the communication and processing circuitry 1042 may be configured to communicate with one or more TRPs utilizing SIM1 1020 and SIM2 1022. In some examples, the communication and processing circuitry 1042 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1042 may include one or more transmit/receive chains.

In some implementations where the communication involves receiving information, the communication and processing circuitry 1042 may obtain information from a component of the UE 1000 (e.g., from the transceiver 1010 that receives the information via radio frequency signaling or some other type of signaling suitable for the applicable communication medium), process (e.g., decode) the information, and output the processed information. For example, the communication and processing circuitry 1042 may output the information to another component of the processor 1004, to the memory 1005, or to the bus interface 1008. In some examples, the communication and processing circuitry 1042 may receive one or more of signals, messages, other information, or any combination thereof. In some examples, the communication and processing circuitry 1042 may receive information via one or more channels. In some examples, the communication and processing circuitry 1042 may include functionality for a means for receiving. In some examples, the communication and processing circuitry 1042 may include functionality for a means for processing, including a means for demodulating, a means for decoding, etc.

In some implementations where the communication involves sending (e.g., transmitting) information, the communication and processing circuitry 1042 may obtain information (e.g., from another component of the processor 1004, the memory 1005, or the bus interface 1008), process (e.g., modulate, encode, etc.) the information, and output the processed information. For example, the communication and processing circuitry 1042 may output the information to the transceiver 1010 (e.g., that transmits the information via radio frequency signaling or some other type of signaling suitable for the applicable communication medium). In some examples, the communication and processing circuitry 1042 may send one or more of signals, messages, other information, or any combination thereof. In some examples, the communication and processing circuitry 1042 may send information via one or more channels. In some examples, the communication and processing circuitry 1042 may include functionality for a means for sending (e.g., a means for transmitting). In some examples, the communication and processing circuitry 1042 may include functionality for a means for generating, including a means for modulating, a means for encoding, etc.

In some examples, the communication and processing circuitry 1042 may be configured to communicate with a first cell utilizing SIM1 1020 and a second cell utilizing SIM2 1022. For example, the communication and processing circuitry 1042 may be configured to communicate with the first cell on an uplink and with the second cell on the downlink. In some examples, the uplink and downlink communication may occur simultaneously. For example, the communication and processing circuitry 1042 may be configured to generate and transmit uplink packets to the first cell during a paging time window on the second cell. In this example, the SIM2 1022 may interrupt receive operations (e.g., downlink operations) of the SIM1 1020 to receive and decode a page during the paging time window.

In some examples, the communication and processing circuitry 1042 may be configured to communicate with the first cell utilizing a first frequency band in a first frequency range and with the second cell utilizing a second frequency band in a second frequency range. For example, the first frequency range may be associated with a first RAT, such as NR, and the second frequency range may be associated with a second RAT, such as LTE. In other examples, the first frequency range and the second frequency range may be associated with the same RAT (e.g., NR or LTE). In this example, the first and second frequency ranges may be the same. In some examples, the communication and processing circuitry 1042 may be configured to communicate in one of multiple frequency ranges utilizing one of the SIM cards (e.g., SIM1 1020). For example, the communication and processing circuitry 1042 may be configured to communicate on FR1 or FR2 (or higher FR) utilizing SIM1 1020. The communication and processing circuitry 1042 may further be configured to execute communication and processing instructions (software) 1052 stored in the computer-readable medium 1006 to implement one or more of the functions described herein.

The processor 1004 may further include paging control circuitry 1044, configured to process paging signals in an MSIM operating environment as well as generate busy indication signals and establish subsequent network communication as described herein. The paging control circuitry 1044 may further be configured to execute paging control instructions (software) 1054 stored in the computer-readable medium 1006 to implement one or more of the functions described herein.

Figure 11:
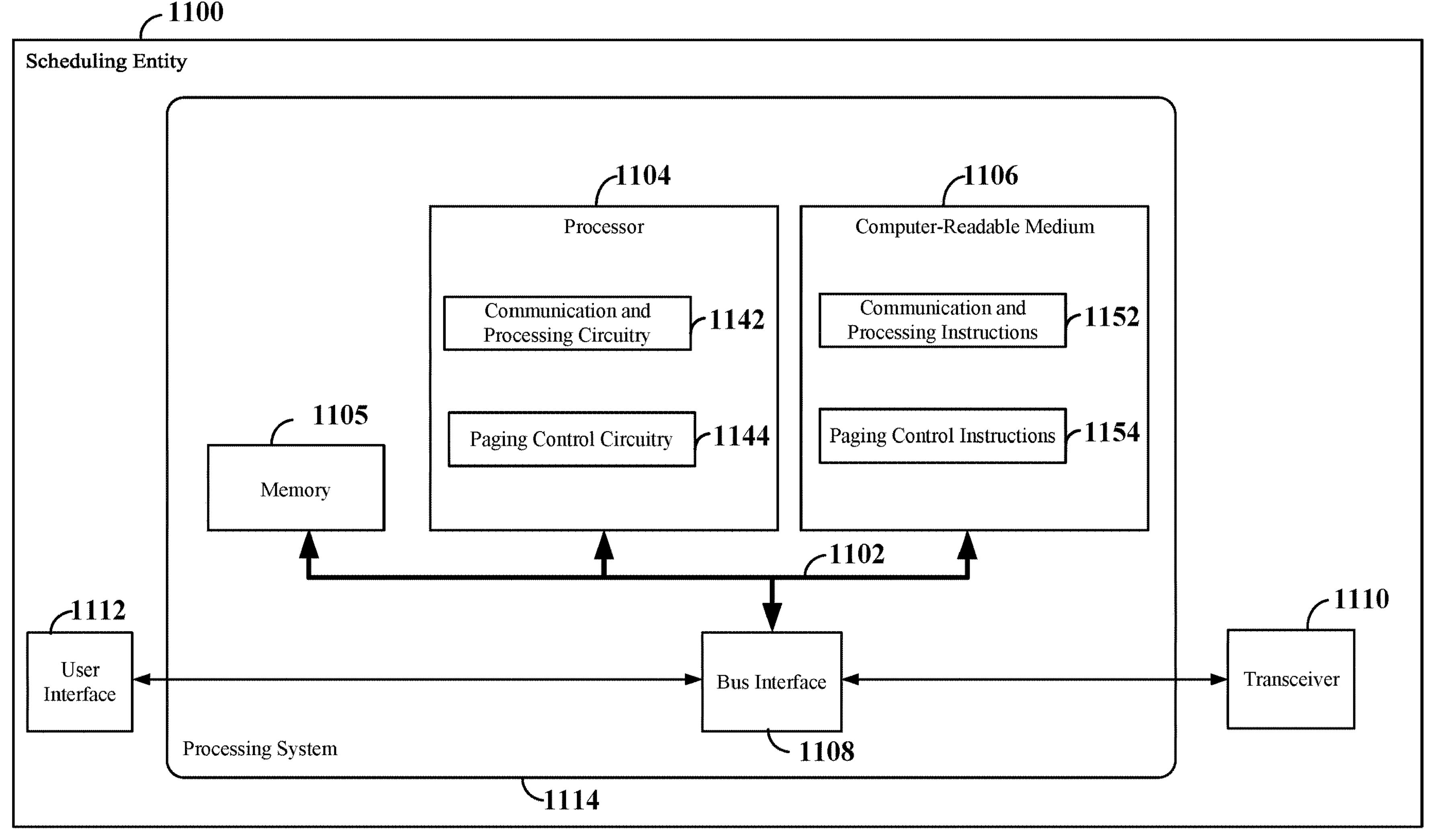
FIG. 11 is a block diagram conceptually illustrating an example of a hardware implementation for a scheduling entity according to some aspects.

FIG. 11 is a block diagram illustrating an example of a hardware implementation for a scheduling entity 1100 employing a processing system according to some aspects. For example, the scheduling entity 1100 may be a base station (such as eNB, gNB), or other scheduling entity as illustrated in any one or more of FIGS. 1, 2, 4-6, 8 and/or 9.

The scheduling entity 1100 may be implemented with a processing system 1114 that includes one or more processors 1104. The processing system 1114 may be substantially the same as the processing system 1114 illustrated in FIG. 11, including a bus interface 1108, a bus 1102, memory 1105, a processor 1104, and a computer-readable medium 1106. Furthermore, the scheduling entity 1100 may include an optional user interface 1112, a transceiver 1110, and an antenna array 1250 substantially similar to those described above in FIG. 11. The processor 1104, as utilized in a scheduling entity 1100, may be used to implement any one or more of the processes described below.

In some aspects of the disclosure, the processor 1104 may include circuitry configured for various functions. For example, the processor 1104 may include communication and processing circuitry 1142, which may be configured similarly to circuitry 1142 described above in connection with FIG. 11. The communication and processing circuitry 1142 may further be configured to execute communication and processing instructions (software) 1152 stored in the computer-readable medium 1106 to implement one or more of the functions described herein.

The processor 1104 may further include paging control circuitry 1144, configured to implement, for example, paging procedures described herein. The paging control circuitry 1144 may further be configured to process busy indication signals received from an MSIM-configured scheduled entity, and to establish network connections in response to the busy indication signals as described herein. The paging control circuitry 1144 may further be configured to execute paging control instructions (software) 1154 stored in the computer-readable medium 1106 to implement one or more of the functions described herein.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, 4-7, 8 and/or 9, and utilizing, for example, the processes and/or algorithms described herein.

Figure 12:
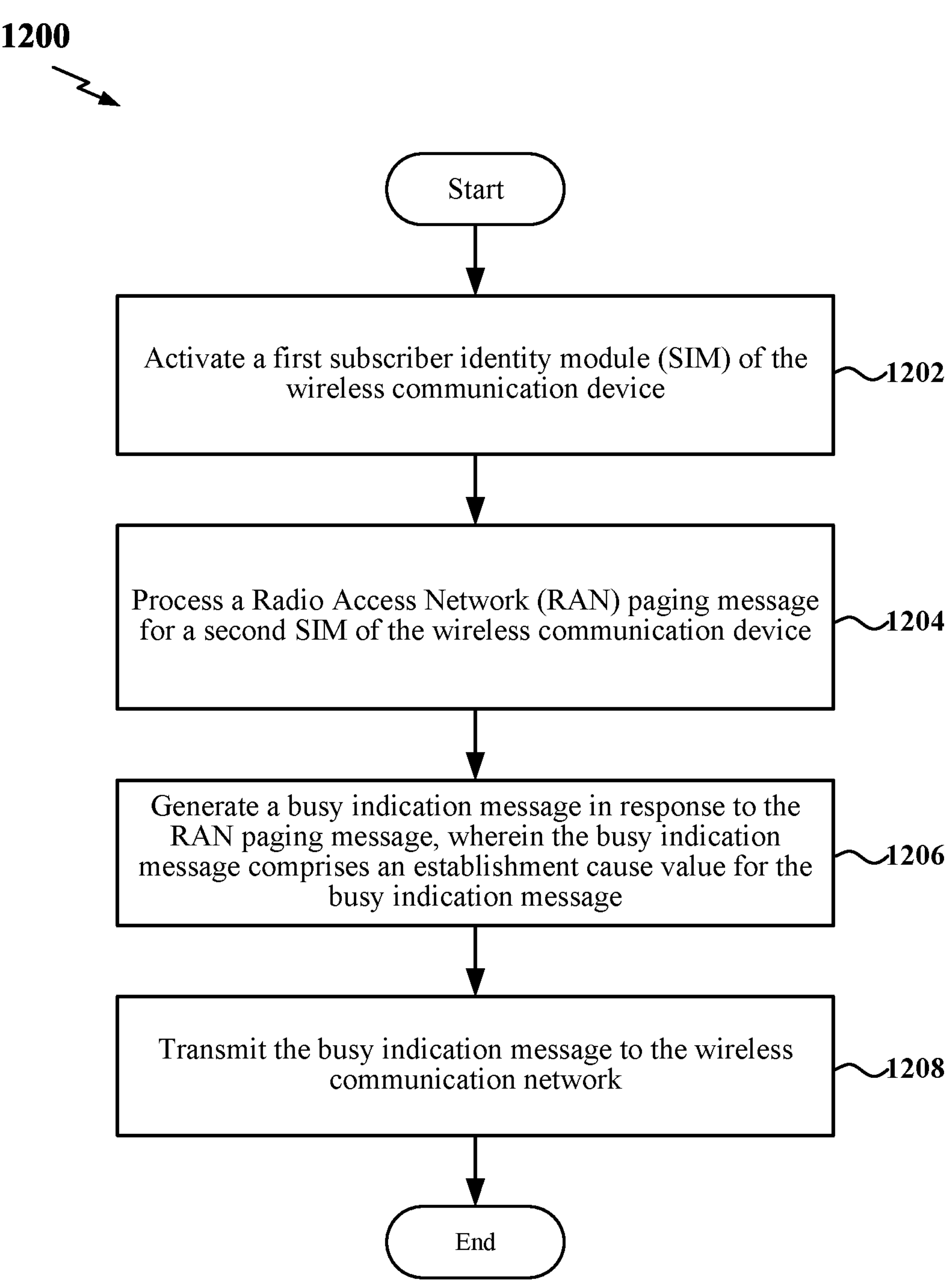
FIG. 12 is a flow chart illustrating an exemplary process for generating a busy indication message in a scheduled entity during a paging process according to some aspects.

FIG. 12 is a flow chart 1200 illustrating an exemplary process for generating a busy indication message in a scheduled entity during a paging process according to some aspects. As described below, some or all illustrated features may be omitted in a particular implementation within the scope of the present disclosure, and some illustrated features may not be required for implementation of all examples. In some examples, the process 1200 may be carried out by the UE 1000 illustrated in FIG. 10. In some examples, the process 1200 may be carried out by any suitable apparatus or means for carrying out the functions or algorithms described below.

In block 1202, a scheduled entity may activate a first subscriber identity module (SIM) of the scheduled entity. For example, the paging control circuitry 1044, together with the communication and processing circuitry 1042 and transceiver 1010, shown and described above in connection with FIG. 10 may provide a means to activate the first SIM of the scheduled entity.

In block 1204, the scheduled entity may process a Radio Access Network (RAN) paging message (e.g., 914) for a second SIM of the scheduled entity. In some examples, processing the RAN paging message may include processing the RAN paging message in an AS layer of the scheduled entity. In some examples, processing the RAN paging message may include processing the RAN paging message to determine page information. For example, the paging control circuitry 1044, together with the communication and processing circuitry 1042 and transceiver 1010, shown and described above in connection with FIG. 10 may provide a means to processes the RAN paging message for the second SIM of the wireless communication device.

In block 1206, the scheduled entity may generate a busy indication message (e.g., 918) in response to the RAN paging message. The busy indication message can include an establishment cause value for the busy indication message. In some examples, generating the busy indication message may include generating the busy indication message in the AS layer based on the processed RAN paging message, and further forwarding the busy indication message to a NAS layer of the scheduled entity. In some examples, the busy indication message may include an Access Identity and/or an Access Class associated with the busy indication signal. In some examples, the busy indication message may include a time duration value indicating a time period in which the second SIM should not receive further paging messages. In some examples, the busy indication message may include protocol data unit (PDU) sessions for which the second SIM should not receive the further paging messages. For example, the paging control circuitry 1044, together with the communication and processing circuitry 1042 and transceiver 1010, shown and described above in connection with FIG. 10 may provide a means to generate a busy indication message in response to the RAN paging message.

In block 1208, the scheduled entity may transmit the busy indication message (e.g., 918) to the wireless communication network (e.g., 908). In some examples, the scheduled entity may transmit the busy indication to the wireless communication network from the NAS layer. In some examples, the scheduled entity may further transmit an update message to the wireless communication network to receive additional paging messages on the second SIM after the time duration value has expired. In some examples, the scheduled entity may place the second SIM in an RRC Inactive state after transmitting the busy indication message. For example, the paging control circuitry 1044, together with the communication and processing circuitry 1042 and transceiver 1010, shown and described above in connection with FIG. 10 may provide a means to transmit the busy indication message to the wireless communication network.

In one configuration, an apparatus (e.g., scheduled entity 1000, such as a UE) configured for wireless communication includes means for performing the processes, procedures, and methods described herein. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, 4-6, and/or 8-10, and utilizing, for example, the processes and/or algorithms described herein in relation to FIGS. 9 and/or 12.

Figure 13:
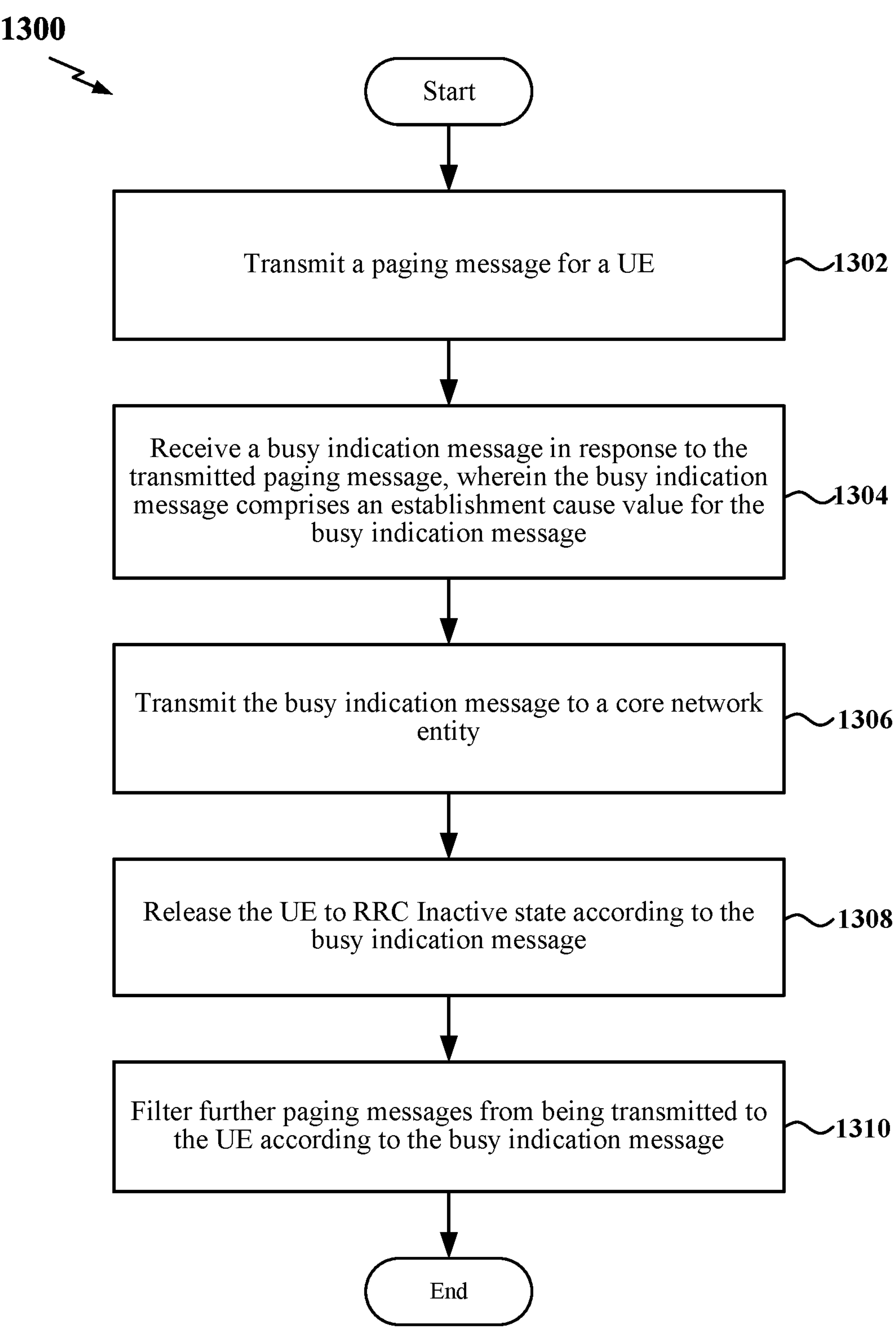
FIG. 13 is a flow chart illustrating an exemplary process for processing a busy indication message in a scheduling entity during a paging process according to some aspects.

FIG. 13 is a flow chart 1300 illustrating an exemplary process for processing a busy indication message in a scheduling entity during a paging process according to some aspects. As described below, some or all illustrated features may be omitted in a particular implementation within the scope of the present disclosure, and some illustrated features may not be required for implementation of all examples. In some examples, the process 1300 may be carried out by the scheduling entity 1100 illustrated in FIG. 11. In some examples, the process 1300 may be carried out by any suitable apparatus or means for carrying out the functions or algorithms described below.

In block 1302, the scheduling entity may transmit a paging message (e.g., 914) for a UE (e.g., 902). For example, the paging control circuitry 1144, together with the communication and processing circuitry 1142 and transceiver 1110, shown and described above in connection with FIG. 11 may provide a means to a transmit a paging message to a UE.

In block 1304, the scheduling entity may receive a busy indication message (e.g., 918) in response to the transmitted paging message. The busy indication message can include an establishment cause value for the busy indication message. In some examples, the busy indication message may include an Access Identity and/or an Access Class associated with the busy indication signal. In some examples, the busy indication message may include a time duration value indicating a time period in which the UE should not receive further paging messages. In some examples, the busy indication message may include protocol data unit (PDU) sessions for which the UE should not receive further paging messages. For example, the paging control circuitry 1144, together with the communication and processing circuitry 1142, shown and described above in connection with FIG. 11 may provide a means to receive a busy indication message in response to the transmitted paging message.

In block 1306, the scheduling entity may release the UE to an RRC Inactive state (e.g., 922) according to the busy indication message. For example, the paging control circuitry 1144, together with the communication and processing circuitry 1142, shown and described above in connection with FIG. 11 may provide a means to release the UE to RRC Inactive state according to the busy indication message.

In block 1308, the scheduling entity may filter further paging messages (e.g., 1028) from being transmitted to the UE according to the busy indication message. In some examples, the scheduling entity may further receive an update message to transmit additional paging messages after the time duration value has expired. For example, the paging control circuitry 1144, together with the communication and processing circuitry 1142, shown and described above in connection with FIG. 11 may provide a means to filter further paging messages from being transmitted to the UE according to the busy indication message.

In one configuration, an apparatus (e.g., scheduling entity 1100, such as a base station) configured for wireless communication includes means for performing the processes, procedures, and methods described herein. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, 4-6, 8, 9 and/or 11, and utilizing, for example, the processes and/or algorithms described herein in relation to FIGS. 9 and/or 13.

The processes shown in FIGS. 12-13 may include additional aspects, such as any single aspect or any combination of aspects described below and/or in connection with one or more other processes described elsewhere herein.

Aspect 1: A method of wireless communication at a wireless communication device in a wireless communication network, comprising: activating a first subscriber identity module (SIM) of the wireless communication device; processing a Radio Access Network (RAN) paging message for a second SIM of the wireless communication device; generating a busy indication message in response to the RAN paging message, wherein the busy indication message comprises an establishment cause value for the busy indication message; and transmitting the busy indication message to the wireless communication network.

Aspect 2: The method of aspect 1, wherein processing the RAN paging message comprises processing the RAN paging message in an access stratum (AS) layer of the wireless communication device.

Aspect 3: The method of aspect 2, wherein generating the busy indication message comprises generating the busy indication message in the AS layer based on the processed RAN paging message, and further comprising forwarding the busy indication message to a non-access stratum (NAS) layer of the UE.

Aspect 4: The method of any of aspect 3, wherein transmitting the busy indication message comprises transmitting the busy indication message to the wireless communication network from the NAS layer.

Aspect 5: The method of any of aspects 1 through 4, wherein processing the RAN paging message comprises processing the RAN paging message to determine page information.

Aspect 6: The method of any of aspects 1 through 5, wherein the busy indication message further comprises an Access Identity and/or an Access Class associated with the busy indication signal.

Aspect 7: The method of any of aspects 1 through 6, wherein the busy indication message comprises a time duration value indicating a time period in which the second SIM should not receive further paging messages.

Aspect 8: The method of aspect 7, wherein the busy indication message further comprises protocol data unit (PDU) sessions for which the second SIM should not receive the further paging messages.

Aspect 9: The method of aspect 7 and/or 8, further comprising transmitting an update message to the wireless communication network to receive additional paging messages on the second SIM after the time duration value has expired.

Aspect 10: The method of any of aspects 1 through 9, further comprising configuring the second SIM to a second SIM in a radio resource control (RRC) Inactive state after transmitting the busy indication message.

Aspect 11: A method of wireless communication at a scheduling entity in a wireless communication network, comprising: transmitting a paging message for a UE; receiving a busy indication message in response to the transmitted paging message, wherein the busy indication message comprises an establishment cause value for the busy indication message; releasing the UE to RRC Inactive state according to the busy indication message; and filtering further paging messages from being transmitted to the UE according to the busy indication message.

Aspect 12: The method of aspect 11, wherein the busy indication message further comprises an Access Identity and/or an Access Class associated with the busy indication signal.

Aspect 13: The method of aspect 11 and/or 12, wherein the busy indication message comprises a time duration value indicating a time period in which the UE should not receive further paging messages.

Aspect 14: The method of aspect 13, wherein the busy indication message further comprises protocol data unit (PDU) sessions for which the UE should not receive the further paging messages.

Aspect 15: The method of any of aspects 11 through 14, comprising receiving an update message to transmit further paging messages after the time duration value has expired.

Aspect 16: A user equipment (UE) in a wireless communication network comprising a transceiver, a memory, and a processor coupled to the transceiver and the memory, the processor and the memory configured to perform a method of any one of aspects 1 through 10.

Aspect 17: A scheduling entity in a wireless communication network comprising a transceiver, a memory, and a processor coupled to the transceiver and the memory, the processor and the memory configured to perform a method of any one of aspects 11 through 15.

Aspect 18: An apparatus for wireless communication comprising at least one means for performing a method of any one of aspects 1 through 10, or aspects 11 through 15.

Aspect 19: A non-transitory computer-readable medium having stored therein instructions executable by one or more processors of a user equipment to perform a method of any one of aspects 1 through 10, or aspects 11 through 15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-6, 8, 9, 10, and/or 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:

a transceiver;

one or more memories;

a first universal subscriber identity module (USIM);

a second USIM; and one or more processors coupled to the first USIM, the second USIM, the transceiver, and the one or more memories, wherein the one or more processors are configured to:

process a Radio Access Network (RAN) paging message for the second USIM, while the first USIM is active;

generate a busy indication message in response to the RAN paging message, wherein the busy indication message comprises an establishment cause value for the busy indication message;

transmit the busy indication message to a wireless communication network; and receive a message from the wireless communication network releasing the UE to a radio resource control RRC Inactive state according to the busy indication message.

2. The UE of claim 1, wherein the one or more processors are configured to process the RAN paging message in an access stratum (AS) layer of the UE.

3. The UE of claim 2, wherein the one or more processors are configured to generate the busy indication message in the AS layer based on the processed RAN paging message, and forward the busy indication message to a non-access stratum (NAS) layer of the UE.

4. The UE of claim 3, wherein the one or more processors are configured to transmit the busy indication message to the wireless communication network from the NAS layer.

5. The UE of claim 1, wherein the one or more processors are configured to process the RAN paging message to determine page information.

6. The UE of claim 1, wherein the one or more processors and one or more memories are further configured to use an Access Identity and/or an Access Class associated with the busy indication signal.

7. The UE of claim 1, wherein the busy indication message comprises a time duration value indicating a time period in which the second USIM should not receive further paging messages.

8. The UE of claim 7, wherein the busy indication message further comprises protocol data unit (PDU) sessions for which the second USIM should not receive the further paging messages.

9. The UE of claim 7, wherein the one or more processors are configured to transmit an update message to the wireless communication network to receive additional paging messages on the second USIM after the time duration value has expired.

10. The UE of claim 1, wherein the one or more processors are configured to operate the second USIM in accordance with the radio resource control (RRC) Inactive state following receipt of the message from the wireless communication network.

11. A method of wireless communication at a wireless communication device, comprising:
- activating a first universal subscriber identity module (USIM) of the wireless communication device;
- processing a Radio Access Network (RAN) paging message for a second USIM of the wireless communication device;
- generating a busy indication message in response to the RAN paging message, wherein the busy indication message comprises an establishment cause value for the busy indication message;
- transmitting the busy indication message to a wireless communication network; and
- receiving a message from the wireless communication network releasing the wireless communication device to a radio resource control RRC Inactive state according to the busy indication message.

12. The method of claim 11, wherein processing the RAN paging message comprises processing he RAN paging message in an access stratum (AS) layer of the wireless communication device.

13. The method of claim 12, wherein generating the busy indication message comprises generating the busy indication message in the AS layer based on the processed RAN paging message, and further comprising forwarding the busy indication message to a non-access stratum (NAS) layer of the wireless communication device.

14. The method of claim 13, wherein transmitting the busy indication message comprises transmitting the busy indication message to the wireless communication network from the NAS layer.

15. The method of claim 11, wherein processing the RAN paging message comprises processing the RAN paging message to determine page information.

16. The method of claim 11, further comprising:
- using an Access Identity and/or an Access Class associated with the busy indication signal.

17. The method of claim 11, wherein the busy indication message comprises a time duration value indicating a time period in which the second USIM should not receive further paging messages.

18. The method of claim 17, further comprising transmitting an update message to the wireless communication network to receive additional paging messages on the second USIM after the time duration value has expired.

19. The method of claim 11, wherein the busy indication message further comprises protocol data unit (PDU) sessions for which the second USIM should not receive further paging messages.

20. The method of claim 11, further comprising operating the second USIM in accordance with the radio resource control (RRC) Inactive state following receipt of the message from the wireless communication network.

21. A scheduling entity for wireless communication, comprising:
- a transceiver;
- one or more memories; and
- one or more processors coupled to the one or more memories, wherein the one or more processors are configured to:
  - transmit a paging message for a user equipment (UE);
  - receive a busy indication message in response to the transmitted paging message, wherein the busy indication message comprises an establishment cause value for the busy indication message;
  - transmit the busy indication message to a core network entity;
  - release the UE to a radio resource control (RRC) Inactive state according to the busy indication message; and
  - filter further paging messages from being transmitted to the UE according to the busy indication message.

22. The scheduling entity of claim 21, wherein the one or more processors are further configured to transmit an indication to the core network entity to not send a non-access stratum (NAS) response to the UE and/or to the scheduling entity.

23. The scheduling entity of claim 22, wherein the indication informs the core network entity of the release of the UE to the RRC Inactive state.

24. The scheduling entity of claim 21, wherein the busy indication message comprises a time duration value indicating a time period in which the UE should not receive further paging messages.

25. The scheduling entity of claim 24, wherein the one or more processors are further configured to receive an update message to transmit additional paging messages after the time duration value has expired.

26. The scheduling entity of claim 21, wherein the busy indication message further comprises protocol data unit (PDU) sessions for which the UE should not receive further paging messages.

27. The scheduling entity of claim 21, wherein the one or more processors are further configured to:
- receive an RRC resume request from the UE; and
- prevent retrieval of a UE context based on the establishment cause value.

28. The scheduling entity of claim 27, wherein the one or more processors are further configured to:
- transmit the RRC resume request and the busy indication message to an anchor base station; and
- transmit an RRC reject message comprising an additional establishment cause value to the UE after transmitting the RRC resume request to the anchor base station.

29. The scheduling entity of claim 21, wherein the one or more processors are further configured to:
- operate without receiving data or signaling messages for an inactive universal subscriber identity module (USIM) of the UE from the core network entity upon transmission of the busy indication message to the core network entity.

30. A method of wireless communication at a scheduling entity in a wireless communication network, comprising:
- transmitting a paging message for a UE;
- receiving a busy indication message in response to the transmitted paging message, wherein the busy indication message comprises an establishment cause value for the busy indication message;

transmitting the busy indication message to a core network entity;

releasing the UE to a radio resource control (RRC) Inactive state according to the busy indication message; and filtering further paging messages from being transmitted to the UE according to the busy indication message.

* * * * *